Feb. 23, 1926.

E. W. DAVIS

LUBRICANT COMPRESSOR

Filed Feb. 16, 1921

1,574,279

Inventor:
Ernest W. Davis

Patented Feb. 23, 1926.

1,574,279

UNITED STATES PATENT OFFICE.

ERNEST W. DAVIS, OF OAK PARK, ILLINOIS, ASSIGNOR TO THE BASSICK MANUFACTURING CO., OF CHICAGO, ILLINOIS, A CORPORATION OF DELAWARE.

LUBRICANT COMPRESSOR.

Application filed February 16, 1921. Serial No. 445,356.

*To all whom it may concern:*

Be it known that I, ERNEST W. DAVIS, a citizen of the United States, and resident of Oak Park, in the county of Cook and State of Illinois, have invented certain new and useful Improvements in Lubricant Compressors, of which the following is a full, clear, concise, and exact description, reference being had to the accompanying drawings, forming a part of this specification.

My invention relates to improvements in lubricant compressors, and is particularly concerned with the provision of a power-operated compressor for supplying lubricant under pressure to any desired point.

My invention is particularly adapted to form a part of a lubricating system comprising a plurality of nipples adapted to be secured to the bearings to be lubricated and a compressor having a discharge conduit provided with a coupling which can be successively attached to and detached from the nipples for the purpose of supplying lubricant thereto under pressure.

The objects of my invention are:—

First; to provide a compressor capable of holding a comparatively large supply of lubricant and means for placing the lubricant under pressures sufficient to force the lubricant to the point or points desired.

Second; to provide a compressor of the character described so constructed that it can be quickly and easily filled with lubricant.

Third; to provide a compressor driven by a motor, the connections between the compressor and the motor being such that the motor can continue to operate continuously while the pressure on the lubricant is maintained substantially constant even though no lubricant is being discharged from the compressor.

Fourth; to provide a compressor of the character described in which the driving connections between the motor and the member which exerts pressure upon the lubricant, are such that while the pressure can be efficiently applied to the lubricant, the reaction of this pressure in the direction of the motor will not have any injurious effect upon the motor.

Fifth; to provide a compressor of the character described in which the driving connections between the motor and the compressor proper comprise a yieldable member which will absorb the power of the motor when the pressure upon the lubricant has reached a predetermined degree.

Sixth; to provide a power-driven compressor in which the connections between the motor and compressor proper include a spring so connected that it will transmit the power of the motor to the lubricant until the lubricant is placed under a predetermined pressure, after which the spring itself will absorb the power of the motor, and, finally, Seventh; to provide a power-operated compressor of the character last described wherein means are provided for preventing the spring upon resuming its untensioned condition from communicating its power to the motor.

Other objects will appear as this description progresses, reference being had to the accompanying drawings, in which—

In both views, similar reference characters will be used for referring to similar parts.

Figure 1:
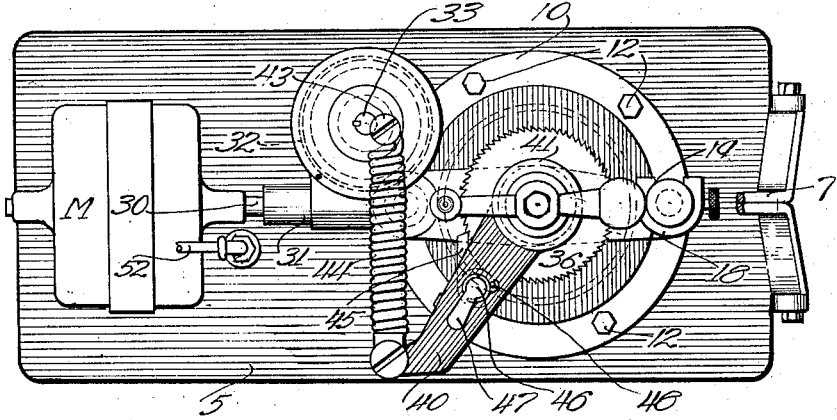
Figure 1 is a plan view of my improved compressor.

I prefer to mount the compressor which I am about to describe upon a platform 5 which is portably mounted upon a plurality of casters 6 and which may be drawn from place to place as desired by means of the tongue 7 and handle 8. The platform 5 is provided with an opening 9 for receiving the base casting or lower end closure 10 of the barrel 11, this casting being secured to the platform by means of bolts 12 or in any other suitable manner. A ring 13 is screw-threaded or otherwise secured to the upper end of the barrel 11 and supports the two vertical pins 14 and 15. The first of these pins acts as a pivot pin for the cap 16, this cap being provided with a suitable bearing 17 for receiving the pin 14. The pin 15 acts as a stop to properly position the cap 16 with relation to the barrel 11 and for this purpose the cap is provided with a lateral extension 18 which is provided with longitudinally extending slot 19 adapted to receive the pin 15.

A plunger comprising the cup-leather 21, the face plate 22 and the follower-plate 23 is slidable in the barrel 11 and secured to the inner reduced end portion 24 of the screw-threaded plunger rod 25. The plunger rod 25 extends through a correspondingly threaded opening 26 in the end of the cap 16 and is provided at its outer end with a handle 27 by means of which it can be manually rotated.

A recess 28 is formed in the inner side of the cap 16 which is of sufficient size to receive the plunger, when the plunger rod 25 is rotated to move the plunger to the upper limit of its stroke. When this is done, the cap 16 can be rotated about the pin 14 as an axis so as to completely uncover the upper end of the barrel 11 to facilitate the filling of the same. The inner side of the ring 13 is beveled as shown at 29 to compress the flange of the cup-leather 21 and guide it into the barrel after the barrel has been filled and the cap has been replaced in registry with the barrel.

Power for operating the plunger may be obtained from a motor M which is secured to the platform 5 and which I have here illustrated as being an electric motor, although my invention is not limited to the use of any particular type of motor. The shaft 30 of the motor drives a worm 31 which, in turn, drives the worm gear 32. The worm gear 32 is rigidly secured to the vertical shaft 33, the upper end of which rotates in a bearing 34 formed integrally with the ring 13. The lower end of the shaft 33, the worm 31 and the worm gear 32 find suitable bearings and are housed in a casing 35 which is secured to one side of the barrel 11.

A ratchet gear 36 is mounted upon the upper side of the cap 16 and provided with a central opening through which the plunger rod 25 projects. A longitudinally extending slot 37 is formed in one side of the plunger rod 25 for receiving one edge of a spline 38, the other edge of which is secured in a corresponding slot in the ratchet gear 36. By this construction, any rotation of the ratchet gear 36 is transmitted to the plunger rod 25 but by reason of the spline connection between the ratchet gear and the plunger rod, the plunger rod can move longitudinally with respect to the ratchet gear.

One end of the pawl arm 40 is provided with an upper portion 41 which is rotatably mounted upon the upwardly extending cylindrical projection 42 of the ratchet gear 36. The other end of the crank or lever 40 is connected with the crank pin 43 secured to the upper end of the shaft 33 by means of a tension spring 44, the opposite ends of this spring being pivotally secured to the pin 43 and the free end of the crank 40, respectively. A pawl 45 is provided with a shaft 46 which extends through the pawl arm 40 and is provided at its upper end with a handle 47 by means of which the pawl 45 can be released from the teeth of the ratchet gear 36. A spring 48, the central portion of which is wrapped about the shaft 46 and the opposite ends of which bear against the handle 47, and a pin carried by the pawl arm 40, respectively, provides means for yieldingly holding the pawl 45 in engagement with the teeth of the ratchet gear.

A discharge conduit 50 communicates with the lower end of the cylinder 11 and is provided with a stand pipe 51 to the upper end of which can be connected a flexible metallic conduit 52 designed to carry the lubricant under considerable pressure and which can be flexed to deliver the lubricant at any point desired. Where my improved lubricant compressor is to form a part of a lubricating system such as referred to above, the end of the flexible conduit can be provided with a coupling member such as that disclosed in my Patent No. 1,401,765 dated December 27, 1921, or a coupling of the usual type can be used in combination with a means for controlling the flow of lubricant through the discharge conduit, disclosed in my Patent No. 1,496,209, dated June 3, 1924.

Figure 2:
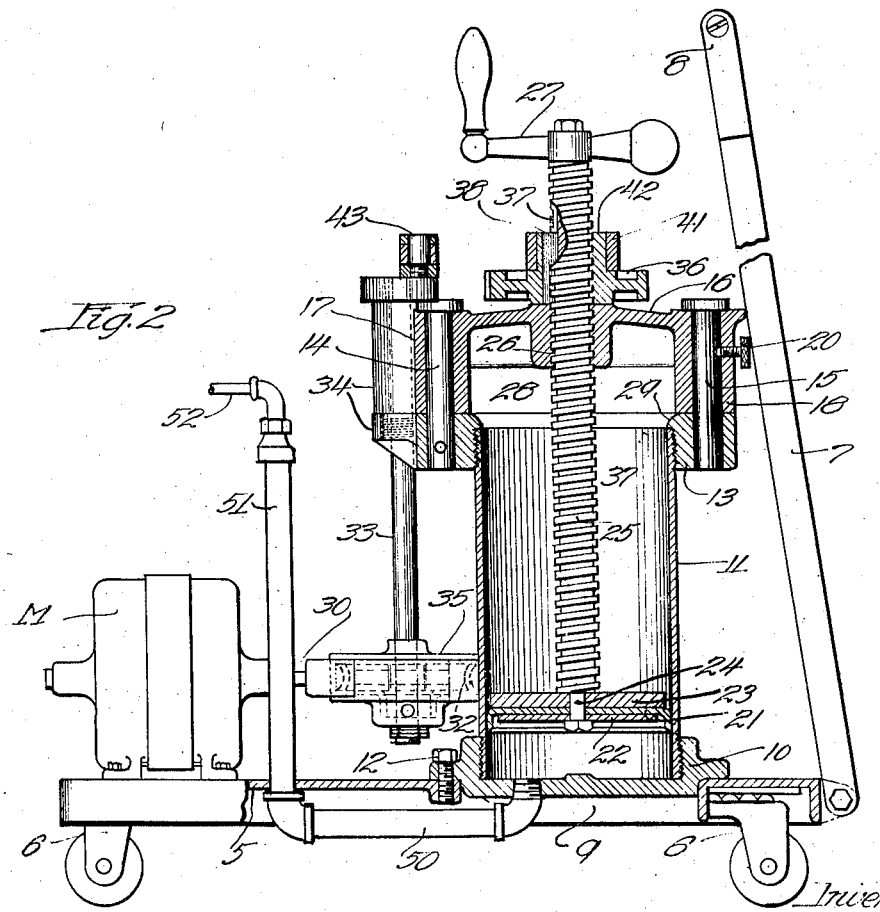
Figure 2 is a side elevation, partially in section showing certain details of construction thereof.

When substantially all of the lubricant has been discharged from the barrel 11 and the plunger occupies substantially the position shown in Figure 2, and it is desired to refill the barrel, the operator releases the pawl 45 from the ratchet gear and then rotates the shaft 25 by means of the handle 27 to bring the plunger up into the recess 28. The thumb screw 20 is then released and the cap 16 swung to one side. The barrel can then be filled to a level just below the top of the ring 13, whereupon the cap 16 is returned to its original position and the set screw 20 secured. The operator then grasps the handle 27 and by rotating it in a direction opposite to that before, brings the plunger into contact with the lubricant. The motor can then be started, whereupon the shaft 33 will rotate and the crank pin 43 will move in a circle about the axis of the shaft 33. The tension of the spring 44 is such that at the beginning it will not be flexed but will communicate the movement of the pin 43 undiminished to the end of the pawl arm 40, thereby causing the crank and the pawl 45 to move in a direction to cause the pawl 45 to engage the teeth of the ratchet gear 36 and rotate this gear and the plunger rod 25 splined thereto. Upon the return stroke of the pin 43 the tension spring 44 will act as a solid rod and thus cause the free end of the pawl arm 40 to move in the opposite direction. The pawl 45 will thus be caused to slide over the teeth of the gear 36 without moving it or the attached plunger rod. This operation will be continued until the force necessary to be exerted on the free end of the pawl arm 40 to produce further pressure upon the lubricant, becomes so great that the spring 44 stretches or flexes during the outward movement of the crank pin 43. When this pressure has been reached, it will remain substantially constant, even though the motor continues to operate and it is immaterial whether lubricant is being withdrawn from the barrel 11 or not.

In this manner, the motor can continue to operate without imposing an undue load upon it, and there is no danger of any portion of the compressor being damaged or destroyed by undue pressure set up in the barrel, or tensions created in the operating portions thereof.

When the pressure on the lubricant has reached such a degree that the spring is alternately flexed and released, there will be a tendency for the spring 44 upon its untensioning or releasing stroke, to comunicate its power to the motor shaft and thus accelerate the motor. This action is, however, effectually prevented by the worm and gear connection between the motor and the shaft 33, the pitch of the worm threads and the worm wheel teeth being such as to prevent any torque exerted upon the shaft 33 from being transmitted to the shaft 30 of the motor.

Whenever lubricant is withdrawn from the compressor so as to reduce the pressure below the maximum pressure determined by the tension of the spring 44, this spring will cease to flex and will again act to transmit the power from the motor to the end of the crank 40 whereupon the plunger will be moved downwardly thus tending to keep the pressure on the lubricant constant.

While I have described the details of construction of the preferred embodiment of my invention, it is to be clearly understood that my invention is not limited to these details but is capable of other adaptations and modifications within the scope of the appended claims.

Having thus described my invention, what I claim is:—

1. A lubricant compressor comprising a barrel, a plunger slidable in said barrel, a cap for said barrel having a recess coaxial with and opening into said barrel for receiving said plunger, said cap being mounted to swing on an axis parallel with the axis of said barrel, the end of said cap having a screw-threaded opening therethrough, a screw-threaded plunger rod extending through said threaded opening and carrying said plunger at its inner end, a handle on the outer end of said plunger rod, a ratchet gear mounted on the end of said cap and having an opening for slidably receiving said plunger rod, means for splining said ratchet gear to said plunger rod, a pawl arm, a pawl secured to said pawl arm for engaging said ratchet and means for oscillating said pawl arm comprising a shaft mounted parallel with said plunger rod, and a tension spring having one end connected to the free end of said pawl arm, and the other end connected to said shaft eccentrically thereof.

2. A lubricant compressor comprising a barrel, a plunger slidable in said barrel, a cap for said barrel mounted to swing on an axis parallel with the axis of said barrel, the end of said cap having a screw-threaded opening therethrough, a screw-threaded plunger rod extending through said threaded opening and carrying said plunger at its inner end, a ratchet gear mounted on the end of said cap and having an opening for slidably receiving said plunger rod, means for splining said ratchet gear to said plunger rod, a pawl arm, a pawl secured to said pawl arm for engaging said ratchet, and means for oscillating said pawl arm comprising a shaft mounted parallel with said plunger rod and a spring having one end connected to the free end of said pawl arm, and the other end connected to said shaft eccentrically thereof.

3. A lubricant compressor comprising a barrel, a plunger slidable in said barrel, a cap for said barrel, the end of said cap having a screw-threaded opening therethrough, a screw-threaded plunger rod extending through said threaded opening and carrying said plunger at its inner end, a ratchet gear for rotating said plunger rod, a pawl arm, a pawl secured to said crank arm for engaging said ratchet, and means for oscillating said pawl arm comprising a shaft mounted parallel with said plunger rod, and a spring having one end connected to the free end of said pawl arm, and the other end connected to said shaft eccentrically thereof.

4. A lubricant compressor comprising a barrel, a plunger slidable in said barrel, a cap for said barrel, the end of said cap having a screw-threaded opening therethrough, a screw-threaded plunger rod extending through said threaded opening and carrying said plunger at its inner end, a ratchet gear for rotating said plunger rod, a pawl arm, a pawl secured to said pawl arm for engaging said ratchet, means for oscillating said pawl arm comprising a spring having one end connected to the free end of said pawl arm and means for alternately flexing and releasing said spring.

5. The combination with a container for lubricant, of a plunger movable within said container, a screw for actuating said plunger extending through said container, a rotatable collar surrounding said screw and adapted to rotate the same, said collar having an annular series of teeth upon its periphery, an oscillatory handle, and a spring pressed dog upon said handle and engageable with the teeth upon said collar.

6. The combination with a barrel adapted to contain lubricant, of a plunger movable within said barrel, a screw fastened to said plunger and threadedly secured to said barrel, said screw having a longitudinally extending key-way, a collar sleeved upon said screw and provided with means engageable in the key-way in said screw for rotating said screw from said collar, said collar having an annular series of teeth on its periphery, an oscillatory handle journalled upon said collar, and means upon said handle engageable with the teeth upon said collar.

7. A lubricating outfit comprising a pump, a rotary power source, and a speed reducing transmission between said source and said pump, said transmission including two speed reductions capable of transmitting power from said source to said pump but not in the other direction, and a resilient take-up intermediate said two reductions, permitting said source and first reduction to continue in operation when said pump is stalled by its load.

8. A lubricating outfit comprising a pump, a power source, and a speed reducing transmission between said source and said pump, said transmission including three speed reductions, the first and third reductions being irreversible and the second including a resilient take-up for permitting said source to operate when said pump is stalled by its load.

9. A lubricating outfit comprising a pump, a power source, and a speed reducing transmission between said source and said pump, said transmission including two speed reductions, the reduction next the source being irreversible and the other including a resilient take-up for permitting said source to operate when said pump is stalled by its load.

In witness whereof, I hereunto subscribe my name this 27th day of January, 1921.

ERNEST W. DAVIS.